(12) United States Patent
Fornos Martinez et al.

(10) Patent No.: US 11,338,520 B2
(45) Date of Patent: May 24, 2022

(54) LAYERING OF A THREE-DIMENSIONAL OBJECT

(71) Applicant: HEWLETT-PACKARD DEVELOPMENT COMPANY, L.P., Spring, TX (US)

(72) Inventors: Pol Fornos Martinez, Sant Cugat del Valles (ES); Juan Antonio Victorio Ferrer, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,208

(22) PCT Filed: Jul. 26, 2018

(86) PCT No.: PCT/US2018/043893
§ 371 (c)(1),
(2) Date: Oct. 14, 2019

(87) PCT Pub. No.: WO2020/023043
PCT Pub. Date: Jan. 30, 2020

(65) Prior Publication Data
US 2021/0323238 A1    Oct. 21, 2021

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/153* (2017.08); *B29C 64/232* (2017.08);
(Continued)

(58) Field of Classification Search
CPC ... B29C 64/153; B29C 64/393; B29C 64/232; B29C 64/245; B33Y 10/00; B33Y 30/00; B33Y 50/02
See application file for complete search history.

(56) References Cited

U.S. PATENT DOCUMENTS

| 5,891,382 A | 4/1999 | Almquist et al. |
| 7,296,990 B2 | 11/2007 | Devos et al. |

(Continued)

FOREIGN PATENT DOCUMENTS

| CN | 1217502 | 5/1999 |
| CN | 108248019 | 7/2018 |

(Continued)

*Primary Examiner* — Nahida Sultana
(74) *Attorney, Agent, or Firm* — HP Inc. Patent Department (57) ABSTRACT

In one example, an apparatus comprising a controller to instruct a build platform to support a plurality of layers of build material in a build zone, wherein the build platform is moveable during a build of a three-dimensional object to change the size of the build zone, wherein the controller is to determine respective displacements of the build platform to successively receive each of the plurality of layers of build material in the build zone during the build, wherein at least one of the respective displacements is based on data determined from a three-dimensional object obtained in a previous build.

20 Claims, 8 Drawing Sheets

(51) Int. Cl.
  *B33Y 30/00* (2015.01)
  *B33Y 50/02* (2015.01)
  *B29C 64/153* (2017.01)
  *B29C 64/232* (2017.01)
  *B29C 64/245* (2017.01)

(52) U.S. Cl.
  CPC ............ *B29C 64/245* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 9,662,840 B1 | 5/2017 | Buller et al. |
| 9,931,697 B2 | 4/2018 | Levin et al. |
| 2008/0138513 A1 | 6/2008 | Perret et al. |
| 2013/0244040 A1 | 9/2013 | Oshima |
| 2015/0088292 A1 | 3/2015 | Inoue et al. |
| 2016/0158962 A1 | 6/2016 | Balistreri et al. |
| 2016/0214327 A1* | 7/2016 | Uckelmann ......... B29C 67/0007 |
| 2016/0320771 A1 | 11/2016 | Huang |
| 2017/0129052 A1* | 5/2017 | Buller .................... B33Y 30/00 |
| 2017/0173887 A1 | 6/2017 | Sasaki |
| 2017/0203515 A1 | 7/2017 | Bennett et al. |
| 2018/0043616 A1* | 2/2018 | Ikeyama ................ B29C 64/214 |
| 2018/0043630 A1 | 2/2018 | Hoover et al. |
| 2018/0093419 A1* | 4/2018 | Lappas .................. G06T 19/00 |
| 2020/0247059 A1* | 8/2020 | Frohnmaier .......... B33Y 30/00 |

FOREIGN PATENT DOCUMENTS

| WO | WO2017005301 A1 | 1/2017 |
|---|---|---|
| WO | WO-2018005439 A1 | 1/2018 |

\* cited by examiner

LAYERING OF A THREE-DIMENSIONAL OBJECT

BACKGROUND

Apparatus to fabricate a three-dimensional (3D) object in an additive manufacturing technique are sometimes referred to as "3D printers". The 3D printer builds a 3D object from selective addition of build material. The 3D object may be produced on a layer-by-layer basis. In one example of additive manufacturing, an object may be generated by solidifying portions of layers of build material. In certain examples, energy may be applied to solidify the portions of build material.

In some 3D printers, a definition of the 3D object is provided in the form of build data defining an object model, or data derived from the object model. The build data may be processed, and the 3D printer then instructed to produce the 3D object on a layer-by-layer basis in a build zone.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in that one example, but not necessarily in other examples.

Additive manufacturing systems, otherwise referred to as "3D printing systems", may produce three-dimensional (3D) objects by solidifying portions of successive layers of a build material. The portions of build material to be solidified may correspond with fusing areas in the layers of build material. The build material may be in the form of a powder provided as a powder bed. The powder is a type of granular build material. A granular build material is a material of a particulate nature. The build material may comprise, for example, plastic, metallic, or ceramic particles. The material properties of 3D objects fabricated by an additive manufacturing system may be dependent on the type of build material and the type of solidification. In additive manufacturing systems, 3D objects may be fabricated based on object data which may be, for example a 3D model of an object generated using a CAD (computer-aided design) computer program. The model data is processed into slices, each slice defining a portion of a layer of build material to be solidified.

Suitable build materials for additive manufacturing include polymers, crystalline plastics, semi-crystalline plastics, polyethylene (PE), polylactic acid (PLA), acrylonitrile butadiene styrene (ABS), thermoplastic polyurethane (TPU), amorphous plastics, Polyvinyl Alcohol Plastic (PVA), Polyamide (such as polyamide (PA) 11, PA12), thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. According to one example, a suitable build material may be PA12 build material commercially referred to as V1R10A 'HP PA12' available from HP Inc. There exist more build materials and blends of build materials that can be managed by example apparatuses disclosed herein and that are not mentioned in this disclosure.

In certain examples, solidification of the build material is enabled and controlled using functional agents. In certain examples, solidification may be further enabled by temporary application of energy to the build material. In certain examples, functional agents such as fusing and/or binding agents are applied to the build material. In an example, a fusing agent is a material that, when a suitable amount of energy is applied to a combination of build material and fuse agent, causes the build material to melt, sinter, fuse or otherwise coalesce and solidify.

Chemical agents, referred to herein as "printing agents", may be selectively deposited onto a layer of build material. Examples of printing agents include fusing agents, detailing agents and binding agents.

A fusing agent (sometimes also referred to as a "coalescing agent") may increase heating of the build material by acting as an energy absorbing agent that can cause build material on which it has been deposited to absorb more energy (e.g. from a radiation source) than build material on which no agent has been deposited. This may cause a defined portion of build material to heat up when energy is applied to the layer of build material. When preheating the region of build material, a desired temperature for the region may be below a melting or fusing temperature of the build material. Application of fusing agent to the region may cause, during a subsequent application of energy to irradiate the region of build material, localized heating of the region of build material to a temperature above the melting or fusing temperature. This can cause the region of build material to melt, sinter, coalesce or fuse, and then solidify after cooling. In this manner, solid parts of the object may be constructed.

A detailing agent (sometimes also referred to as a "modifying agent") may act to modify the effect of a fusing agent and/or act directly to cool build material.

A binding agent (sometimes also referred to as a "binder") may act to cause build material on which it has been deposited to solidify via binding. A binding agent is different from a fusing agent in that a fusing agent acts as an energy absorbing agent that causes build material on which it has been deposited to absorb more energy than the build material would absorb in the absence of the fusing agent. A binding material or binder, on the other hand, chemically acts to draw build material together to form a cohesive whole. For example, application of energy, e.g. using an energy or radiation source such as ultraviolet (UV) light, may activate the binding agent to bind portions of the build material. In the case of UV curable binding agents, activation of the agent is by light rather than heat.

For a given layer of build material to be solidified, energy may be applied during the build process. Energy may be applied to fuse the build material on which fusing agent has been applied. The build material may be heated to a temperature that is below the melting point or fusing point for the build material. The fusing point for the build material may be a temperature value at which particulates of the build material begin to fuse to one another. One or more of the printing agents described above may then be deposited onto the preheated build material. Following the deposition of the printing agents, energy is applied to irradiate the printing agents, causing localized heating to a temperature above the melting point or fusing point of the build material, resulting in fusing of the build material.

After applying energy to a layer of build material to fuse the build material, the build material cools and solidifies in a solidification process. During the solidification process the build material may crystallize. The rate of solidification is determined by the rate of cooling. The rate of cooling is affected by the surrounding thermal mass of the build material and the thermal mass of a build zone in which the build material is deposited. For example, build material in a central region commonly cools at a lower rate than build material in an edge region because the build material in the central region is surrounded by more build material and dissipates heat more slowly. Build material at an edge of a build area therefore crystalizes faster than build material in a middle of the build area because heat dissipation at the edge is greater. The build zone refers to the space available for receiving build material to build the layers of build material. The layers of build material that are received may then be collectively referred to as a build volume.

During cooling, the build material may decrease in size. The decrease in size is commonly referred to as shrinkage. The amount of shrinkage of the build material is dependent on when the layer of build material was deposited. Layers deposited earlier have more time to cool and therefore shrink more than layers deposited later. In some additive manufacturing systems, the effect of shrinkage is greatest at an edge region of the build volume.

In certain additive manufacturing systems, each layer of build material that is deposited in a build zone has a thickness which is substantially the same. However, a final thickness of the layer of build material may vary because of the different amounts of shrinkage caused by the different rates of cooling. In addition to the temperature effects, shrinkage of build material also occurs by gravitational compaction by subsequent layers of build material. For example, a layer of build material which acts as a lower, supporting layer to at least one upper, supported layer is affected by the weight of the build material in the supported layer. The supporting layer is compacted by the presence of the subsequent layers that are deposited subsequently on the supporting layer. This gravitational compaction affects each layers of build material differently and therefore contributes to different rates of shrinkage of the build material. In most additive manufacturing systems, where each layer is added in a Z-axis direction, the effect of gravitational compaction is greatest in the Z-axis direction. The term gravitational compaction refers to natural compression of a layer caused solely by the mass of a subsequent layer.

For some 3D printers, the dimensional accuracy of a 3D object produced by the 3D printer is influenced by the effect of shrinkage caused by temperature and gravitational compaction. When a column of 3D objects is produced in a build volume, one 3D object on top of the other, a 3D object on a lower row of the column may have a reduced dimension in the Z-axis direction compared to a 3D object on a higher row of the column. When a matrix of 3D objects is produced, this may affect an entire column of 3D objects. Even if each 3D object of an entire row of 3D objects is affected by gravitational compaction similarly, the effect of temperature compaction by different cooling rates will depend on the location of the 3D object in the build volume. Observing a column of 3D objects, the 3D object on the lower row of the column of 3D objects is affected by greater shrinkage because of the longer cooling time and higher mass of build material acting on the 3D object on the lower row compared to a 3D object on a higher row. The dimensional accuracy is determined by comparing a dimension of the final 3D object produced by the printer and the same dimension in a build plan before the 3D object is produced.

An apparatus such as an additive manufacturing system may comprise different units. An example of an additive manufacturing system may comprise a controller and a build unit. The controller may comprise a storage module encoded with instructions executable by a processor as described further below. In certain examples, the build unit may be a component that is separate from the remaining components of the additive manufacturing system. For example, the build unit may be a removable or interchangeable unit that is separate from the controller. For example, the build unit may be interchangeable with other build units. For example, build units that have different operating parameters. For example, a build unit to build with a different build material. In an example, the build unit may be interchangeable with another build unit for the sake of regular maintenance of the build unit(s).

The build unit may comprise a build platform that provides a build area, sometimes referred to as a working area or a printable area, on which a 3D object may be built. The additive manufacturing system may comprise a printing system. In certain examples, the build unit may comprise the printing system. In certain examples, the printing system may be a separate component of the additive manufacturing system. For example, the printing system may be a removable or interchangeable system that is separate from the build unit. For example, the printing system may be interchangeable with other printing systems which have different operating parameters that can deposit a different range of materials.

The printing system may comprise a build material deposit system for depositing a layer of build material on the build platform. The build material deposit system may comprise a build material store. The build material store may contain build material from which a 3D object may be built. In certain examples, the printing system may comprise a fusing agent application system to apply fusing agent to the layer of build material. For example, the fusing agent application system may comprise a set of printheads with nozzles that fire the fusing agent onto the layer of build material. For example, the fusing agent application system may comprise a set of printheads with nozzles that print liquid agents on the layer of build material. In certain examples, the printing system may comprise a detailing agent application system to apply detailing agent to the layer of build material. For example, the detailing agent application system may comprise a set of printheads with nozzles that fire the detailing agent onto the layer of build material. For example, the detailing agent application system may comprise a set of printheads with nozzles that print detailing agent on the layer of build material.

The additive manufacturing system may comprise a fusing system. In certain examples, the build unit may comprise the fusing system. In certain examples, the fusing system may be a removable or interchangeable system of the build unit. In certain examples, the printing system may be integrated with the fusing system. In certain examples, the printing system and the fusing system may be removeable from each other and interchangeable with other printing and/or fusing systems. In certain examples, the fusing system may be a separate component of the additive manufacturing system. For example, the fusing system may be a removable or interchangeable system of the additive manufacturing system. In an example, the fusing system may temporarily apply energy to a layer of build material deposited on the build platform. In certain examples, the energy may be applied substantially uniformly across the whole layer of build material. For example, the energy source of the fusing system may be 'scanned' over the width of the layer of build material to apply energy to the whole of the layer of build material. For example, the fusing system may temporarily apply energy to fusing areas of the layer of build material defined by fusing agent applied to the layer of build material.

It should be understood that the additive manufacturing system may comprise all of, or some of, or one of, the units, components, and/or systems described above. For example, the additive manufacturing system comprising a controller and a fusing system may be supplied to a user separately of a build unit. Such an additive manufacturing system may operate with a range of different build units, for example. In an example, the additive manufacturing system comprising the controller having a storage module encoded with executable instructions, as described further below, may be supplied to a user separately of a fusing system, printing system, and/or a build unit.

An example build process will now be described. To build a three-dimensional (3D) object with, for example, the additive manufacturing system above, a series of build layers are successively added to the build platform during a build process. Each build layer comprises a layer of build material deposited on the build platform and, in certain examples, functional agents selectively applied to the layer of build material.

In certain examples, fusing agent is selectively applied to the layer of build material, based on build data as discussed below, to define fusing areas of the build layer where the build material is to be fused together. In certain examples, detailing agent may be applied to regions of the layer of build material.

Energy may then be applied to the build layer by the fusing system. In certain examples, following the application of functional agents, the subsequent application of energy fuses portions of the build material according to the agents that have been applied.

For example, portions of the build material, corresponding to the fusing areas of the build layer, may be fused by the absorption of the applied energy. For example, portions of the build material, where fusing agent was applied, may be fused by the absorption of the applied energy. The fused portions define one layer of the 3D object.

In certain examples, where detailing agent has been applied to regions of the layer of build material, the fusing action may be reduced or completely nullified by absorbing the energy without fusing the build material.

In certain examples, the build platform may be moved so that another layer may be added on top of the completed layer. For example, the build platform may be moved vertically downwards so that another layer of build material may be deposited on top of the previous build layer. The build process may continue by building the next build layer in the series thereby adding another layer to the 3D object. The build process may continue adding 3D object layers until the 3D object is completed. The 3D object can then be removed from the build platform.

In certain examples, the build process may be performed in the build unit of the additive manufacturing system based on build data derived from a 3D object model of the 3D object. For example, the controller may instruct the build unit to perform the build process based on build data derived from the 3D object model. The build process may involve building a larger 3D model that contains a plurality of 3D object models. For example, the 3D model may be a 3D model of the working area of the build unit in which several 3D object models are arranged for the purposes of building.

In certain examples, the build data may include build data relating to each build layer to be built on the built platform to fabricate a 3D object based on the 3D object model. For example, the build data relating to each build layer includes build data defining the fusing area(s) for each build layer. The build data may define the boundary(s), and therefore the size and position, of the fusing area(s) with respect to the build platform of the built unit. In certain examples, the build data relating to each layer may include data defining areas of the layer of build material to which detailing agent may be applied.

The build data relating to each layer may be derived by slicing the 3D object model at regular intervals along one of its axes to define a series of cross sections through the 3D object model. The series of cross sections may be parallel cross sections. The size of the interval may correspond with the desired thickness of each build layer, which may be determined by such factors as desired resolution of the completed 3D object.

It is desirable that the boundaries of the fused portions for each built 3D object layer correspond to the contour lines of the respective cross section through the 3D object model. Since the fused portion(s) for each built 3D object layer correspond with the fusing area(s) of the respective build layer, the boundary, or boundaries, for each fusing area also correspond to the contour line, or lines, of the respective cross section through the 3D object model. Hence, the build data defining the fusing area(s) for the build layer may be derived from the respective cross section through the 3D object model.

Figure 1:
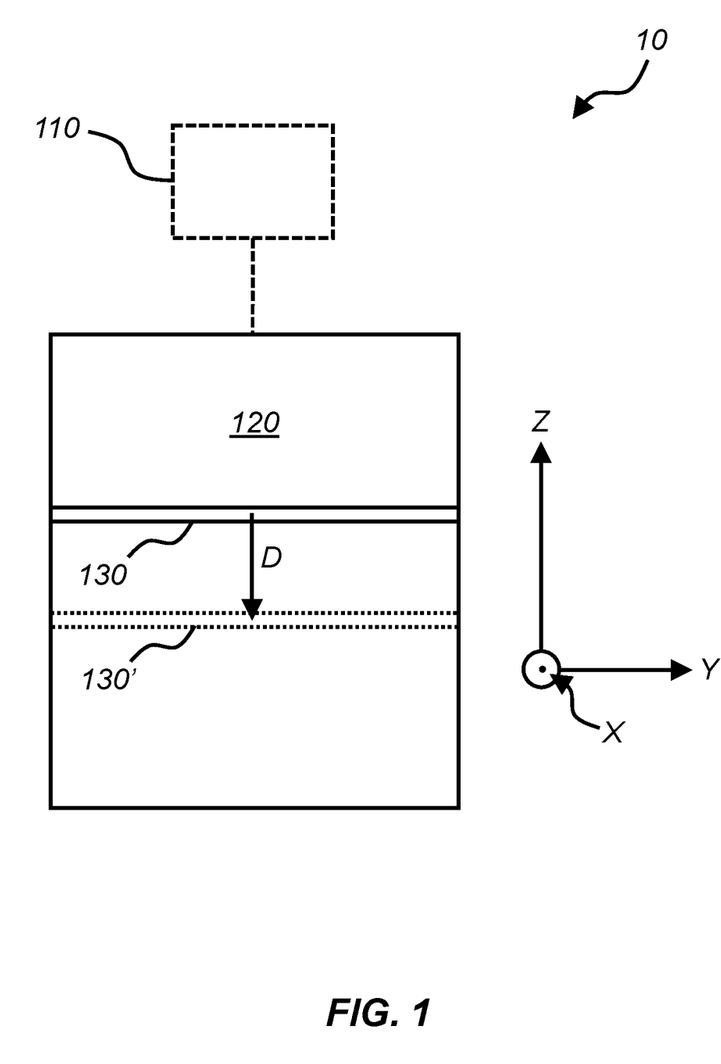
FIG. 1 is a schematic view of an apparatus in accordance with an example.

FIG. 1 schematically illustrates an apparatus 10 according to an example. The apparatus 10 is to generate a three-dimensional object from a plurality of layers of build material. The apparatus, which is an example of an additive manufacturing system, can fabricate a three-dimensional (3D) object on a build platform 130 in a build zone 120. The build platform 130 and build zone 120 are comprised by a build unit. The apparatus may comprise the build unit. The terms fabricating, generating and manufacturing are used interchangeably in this disclosure. The build platform 130 is schematically shown in cross-sectional side view in FIG. 1. For ease of understanding, the apparatus 10, along with its functionality, will be described with respect to a cartesian coordinate system (X, Y, Z) as shown in the figures (the X-axis direction, sometimes referred to as the X-direction, is into the page as shown by the encircled dot).

The build platform 130 is to support a plurality of layers of build material in a build zone 120, sometimes referred to as a print chamber or build volume (the latter is used particularly when the layers of build material are present on the build platform 130). The build platform 130 provides support to a 3D object as it is built (i.e. printed) and supports build material from which the 3D object is built. The build platform 130 is therefore a supporting member and may be provided as a plate. The build platform 130 is moveable during generation of a three-dimensional object to change the size of the build zone 120. The generation of a three-dimensional object by the apparatus 10 can be referred to as a build.

In the example of FIG. 1, a first position of the build platform 130 is shown with the build platform 130 in solid line and a second, subsequent position of the build platform 130' is shown in dashed lines. The movement of the build platform 130, 130' is shown by arrow D. The movement of the build platform 130, 130' is shown in the Z-axis direction, sometimes referred to as the Z-direction. A controller 110 is shown. The controller 110 is to instruct the build platform. The controller 110 is to determine respective displacements of the build platform 130 to successively receive each of the plurality of layers of build material in the build zone 120 during the build. At least one of the respective displacements that is determined by the controller 110 is based on data determined from a three-dimensional object obtained in a previous build. The previous build is a build of a separate three-dimensional object that is performed before the current build. The previous build may be performed as a calibration and may be performed on the current apparatus or a different apparatus. The data may be determined by measuring a physical property of a previously built three-dimensional object. The physical property may be a dimension, such as a linear dimension. The measured physical property may be compared with a desired physical property, such as a desired overall height of a virtual three-dimensional object.

In some examples, the set of displacements may be determined prior to starting a build of a 3D object, for example before build material is present on the build platform 130 and/or before the build platform 130 is moved for a first time in a build program. In some examples, the set of displacements may be determined in a calibration, which may be referred to as a calibration build. The calibration build may be performed separately to a build program of a 3D object, that is before a first layer of build material is received in the build zone. The set of displacements may therefore be predetermined. The predetermined nature of the set of displacements mean that the set of displacements are not created during the current build. Therefore, the set of displacements are not created 'on the fly'. In some examples, the set of displacements may be accessed by the controller 110 from a data storage.

In some examples, the data comprises a deviation of a dimension of the three-dimensional object from a corresponding dimension of a virtual three-dimensional object in a build plan. The term virtual refers to a computerized model of a 3D object, sometimes referred to as an object model. The virtual 3D object may be generated using a CAD computer program. The term build plan may comprise build data defining an object model.

In some examples, the at least one of the respective displacements of the build platform 130 is based on data determined from a plurality of three-dimensional objects obtained from the same previous build. In some examples, each of the plurality of three-dimensional objects is built at a different depth in the build volume. The depth direction may correspond to a direction of layering of the build material. The direction of layering may refer to the Z-direction. For example, one of three-dimensional object may be built in a layer above another layer of another three-dimensional object. The plurality of three-dimensional objects may therefore be stacked in the Z-direction. In some examples, the plurality of three-dimensional objects are arranged in a central region of a working area of the build zone 120. In some examples, the data comprises a deviation of a dimension of each of the three-dimensional objects from a corresponding dimension of a virtual three-dimensional object in a build plan. The dimension may be a height of each three-dimensional object. The height may be measured from the three-dimensional object at a portion of the three-dimensional object that corresponded to a central region of the working area of the build zone 120 when the three-dimensional object was generated. A user of the apparatus may input the measurement into the apparatus. The measurement may input into the apparatus 10 using an input device. The input device may comprise a graphical user interface.

In some examples, a plurality of the displacements of the build platform 130 is based on data determined from a three-dimensional object obtained in a previous build, and wherein a magnitude of one of the plurality of displacements of the build platform 130 is different to a magnitude of another one of the plurality of displacements of the build platform 130. In some examples, each successive displacement of the plurality of displacements of the build platform 130 is equal to or lower in magnitude than a magnitude of a previous displacement of the build platform 130 during the build.

In some examples, differences in magnitude between successive displacements may be equal. In some examples, a relative difference between successive displacements of a subset of displacements may be constant.

In some examples, each displacement of the build platform 130 may be progressively lower than a respective previous displacement of the build platform 130. In other examples, an expansion effect of the build material may occur rather than a shrinkage effect and each displacement of the build platform 130 may be progressively higher than a respective previous displacement of the build platform 130.

In some examples, the controller 110 is to determine the at least one displacement on the basis of the build material, for example the composition of the build material. The at least displacement may alternatively or additionally be determined on the basis of a build program. In some examples, the build program includes a single pass of a depositor across a working area of the build platform 130. In other examples, the build program includes a plurality of passes of a depositor across the working area of the build platform 130.

Figure 2:
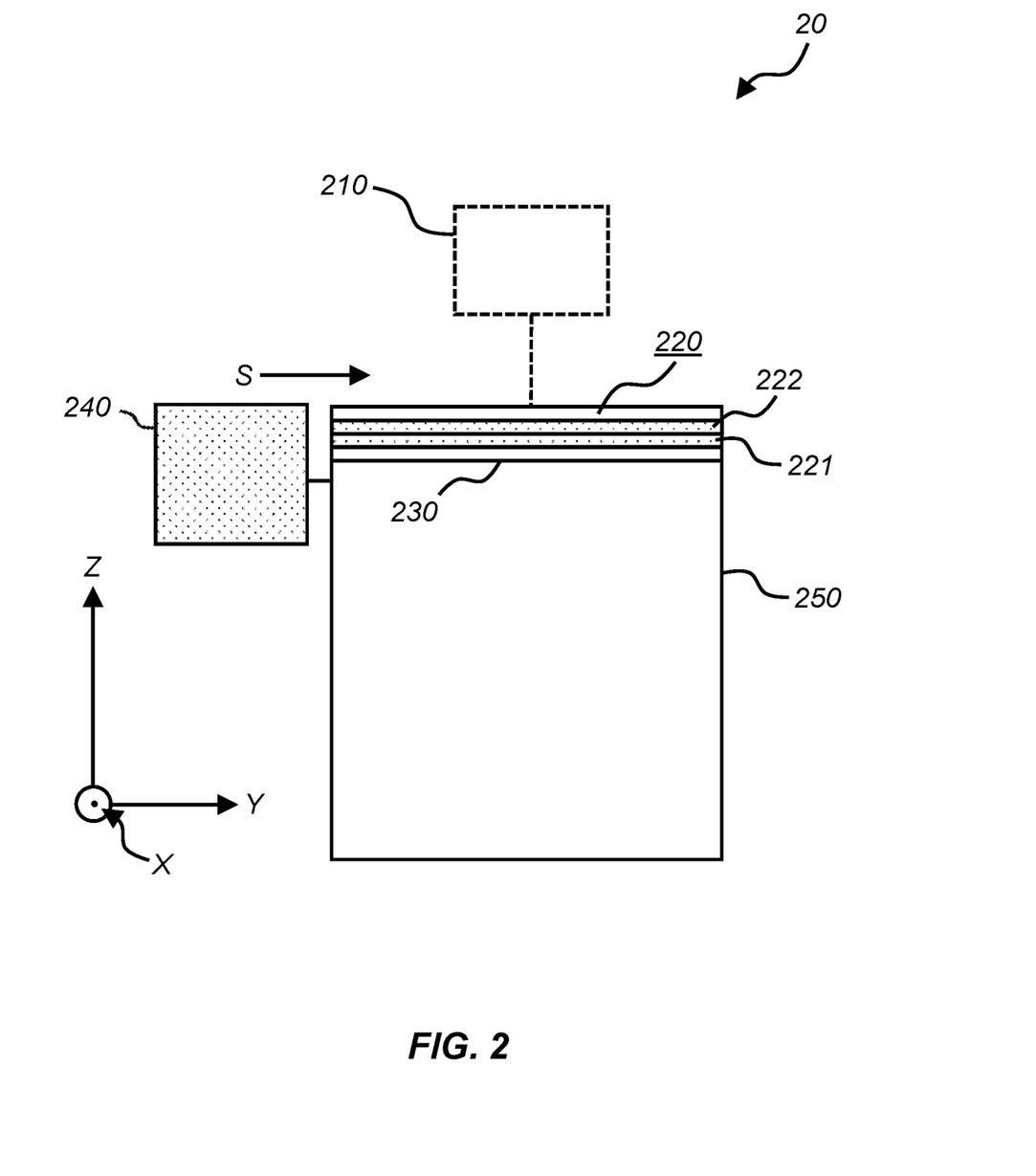
FIG. 2 is a schematic view of an apparatus in accordance with an example.

FIG. 2 schematically illustrates an apparatus 20 according to an example. The apparatus 20 is to print a three-dimensional object from printing material of a particulate nature. The system 20 comprises a build unit 250. The build unit comprises a build platform 230 and a build zone 220. The build platform 230 may extend in the X-direction and the Y-axis direction (sometimes referred to as the Y-direction). The build platform 230 may be movable in a three-dimensional space to change a size of the build zone 220. For example, the build platform 230 may be movable in the Z-direction to allow a plurality of build layers to be built. For example, the build platform 130 may be movable incrementally in the Z-direction. Unfused build material may provide a base for at least one successive build layer to support the at least one successive build layer and the solidified 3D object itself as the 3D object is built.

An example of a build layer 221, 222, from which a layer of a 3D object may be built, is shown in FIG. 2. The build layer 221, 222, comprises a first layer 221 of build material deposited on the build platform 230 and a second layer 222 of build material deposited on the build platform 230 in a subsequent deposition of build material. The build layer 221, 222, may comprise a fusing area that corresponds to a portion of build material that, when fused, will form a 3D object layer. More than one 3D object may be fabricated in the build zone 220 and on the build platform 230 meaning there may be a plurality of fusing areas on the build layer 221, 222. A 3D object layer may itself comprise more than one fusing area on a build layer 221, 222.

The example apparatus 20 may include a depositor 240 which is a build material deposit system for depositing a layer of build material on the build platform 230. The depositor 240 comprises a build material store to store the build material for deposition into the build zone 220. A supply of build material is shown in supply direction S. The build material provided from the depositor can be considered a fresh deposit of build material. The depositor 240 applies build material to a working area of the build zone 220. The build material may be spread across the working area to occupy a void in the build zone 220 created by movement of the build platform 230. The void may correspond to a layer of build material and a height of the void may correspond to a thickness of the layer of build material that is deposited. The controller 210 may determine the size of the void so that a thickness of deposited build material is determined, wherein the size of the void is determined by a displacement of the build platform 230 in the Z-direction.

The example apparatus 20 may include a fusing system for fusing portions of the build material deposited on the build platform 230. The fusing system may be positioned above the build platform 230 (in the Z-direction). The fusing system may be positioned a distance above the build platform 230. The fusing system may temporarily apply energy to a layer of build material deposited on the build platform 230. The fusing system may comprise a movable fusing carriage that radiates energy towards the build platform 230 as it passes overhead. The fusing areas absorb radiated energy from the fusing carriage as it passes overhead causing corresponding portions of the build material to heat up and fuse to form a 3D object layer. In certain examples, the fusing agent may aid the absorption of the energy radiated to the build platform 230.

The controller 210 shown in FIG. 2 may be fully integrated with the build unit 250 in a single package. Alternatively, the controller 210 may be remote from the build unit 250. For example, the controller 210 may be remotely connected to the build unit over a network, which would allow the controller 210 and the build unit 250 to be located separately from each other, including the possibility of being separated by large distances. Thus, the connection may be a network connection.

The controller 210 may comprise a processor. The processor may carry out the methods and/or processes described herein or instruct the methods and/or processes described herein to be carried out in the build unit 250. The controller 210 may comprise a storage module. The storage module may comprise a non-transitory storage medium. The non-transitory machine-readable storage medium may be encoded with instructions executable by the processor. Some examples of non-transitory storage media are disks, thumb drives, memory cards and do not include propagated signals.

Within apparatus, such as the example apparatus 10, 20 shown in FIGS. 1 and 2, respectively it is often desired to fabricate high quality 3D objects. For example, these may be 3D objects with well-defined surfaces and good stability. Issues with 3D object quality during fabrication may lead to 3D objects being discarded, which is wasteful of both manufacturing time and materials. Quality issues may also be in the form of dimensional errors building up in the 3D object or in the visual appearance of the finished 3D object being unsatisfactory.

Some of these quality issues may be caused by shrinkage variation across regions of a build layer and between build layers. The shrinkage absorption variation may be caused by different rates of cooling or different compaction effects on the build layer. The Applicant has identified that the compaction effect can be compensated for to reduce the effect of shrinkage on a build later. The compensation includes a change in a displacement of the build platform.

Figure 3:
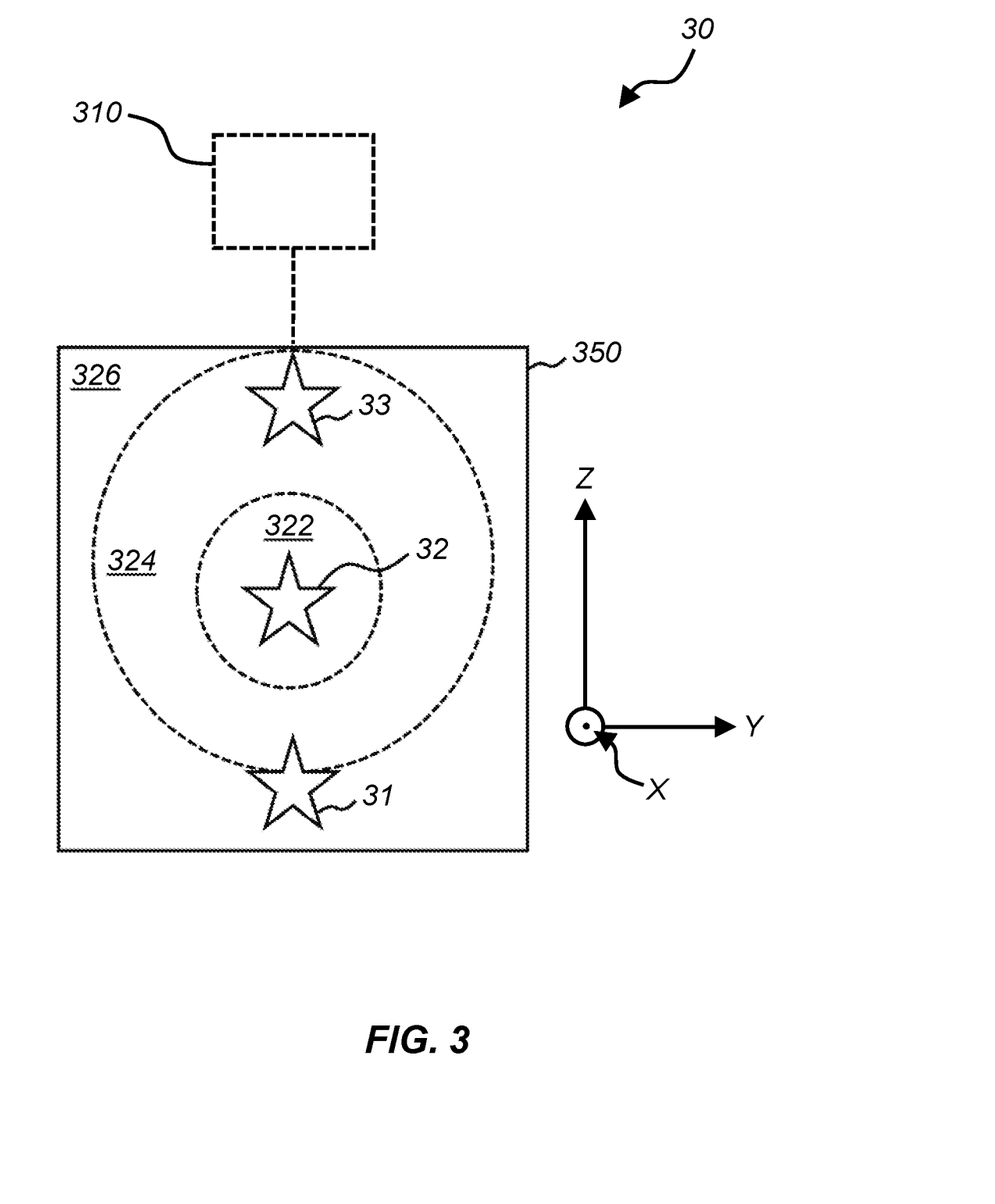
FIG. 3 is a schematic view of an apparatus in accordance with an example.

FIG. 3 schematically illustrates an apparatus 30 according to an example. The apparatus 30 illustrates the thermal behavior of an apparatus 30. In the example shown. a temperature distribution exists. The temperature distribution comprises a plurality of temperature gradients within the build unit 350 when a 3D object is built by the apparatus 30. The apparatus 30 comprises a controller 310 as previously described in the examples of FIGS. 1 and 2. The controller 310 determines a set of displacements of the build platform (not shown in FIG. 3) to receive successive layers of build material.

According to the example of FIG. 3, the temperature gradient is shown with a first element 322, a second element 324 and a third element 326. The first element 322 of the temperature gradient is an inner region of the build unit 350 and represents a part of the build zone that has a relatively high thermal mass due to a greater distance to external walls of the build unit 350. The second element 324 surrounds the first element 322 and is a middle region of the build unit 350. The second element 324 represents a part of the build zone that has a lower thermal mass compared to the first element 322 due to a lower distance to external walls of the build unit 350. The third element 326 surrounds the second element 324 and is an outer region of the build unit 350. The third element 326 has dissipates heat more quickly than the first element 322 and the second element 324.

In the example of FIG. 3, a plurality of 3D objects is shown, wherein each 3D object is arranged in a layer. A first 3D object 31 is shown in the lowermost layer. The first 3D object 31 is built before a 3D object in another layer above. The second 3D object 32 is built after the first 3D object 31 but before a third 3D object 33. Therefore, the first object 31 has the longest time to cool and be influenced by the effect of gravitational compaction of the subsequent build layers. The 3D objects are stacked with build material that is unfused between each layer to support the 3D objects. Each 3D object 31, 32, 33 comprises internal layers of build material. Each layer is naturally compacted by the weight of a successive layer. When the controller 310 determines a constant displacement of the build platform, the first 3D object 31 comprises a dimension in the Z-direction which is smaller than the same dimension measured on the second and third 3D objects 32, 33. This is caused by shrinkage of the layers of build material. Natural compaction caused by the weight of a successively deposited layer of build material on a previously deposited layer of build material contributes to the shrinkage effect. The rate of cooling of the build material caused by the different temperature gradients further exaggerates the shrinkage. The controller 310 is therefore to provide a first displacement of the build platform that is different to a second displacement of the build platform to compensate for the shrinkage effect caused by natural, gravitational compaction. In some examples, each successive displacement is lower than a previous displacement.

Figure 4:
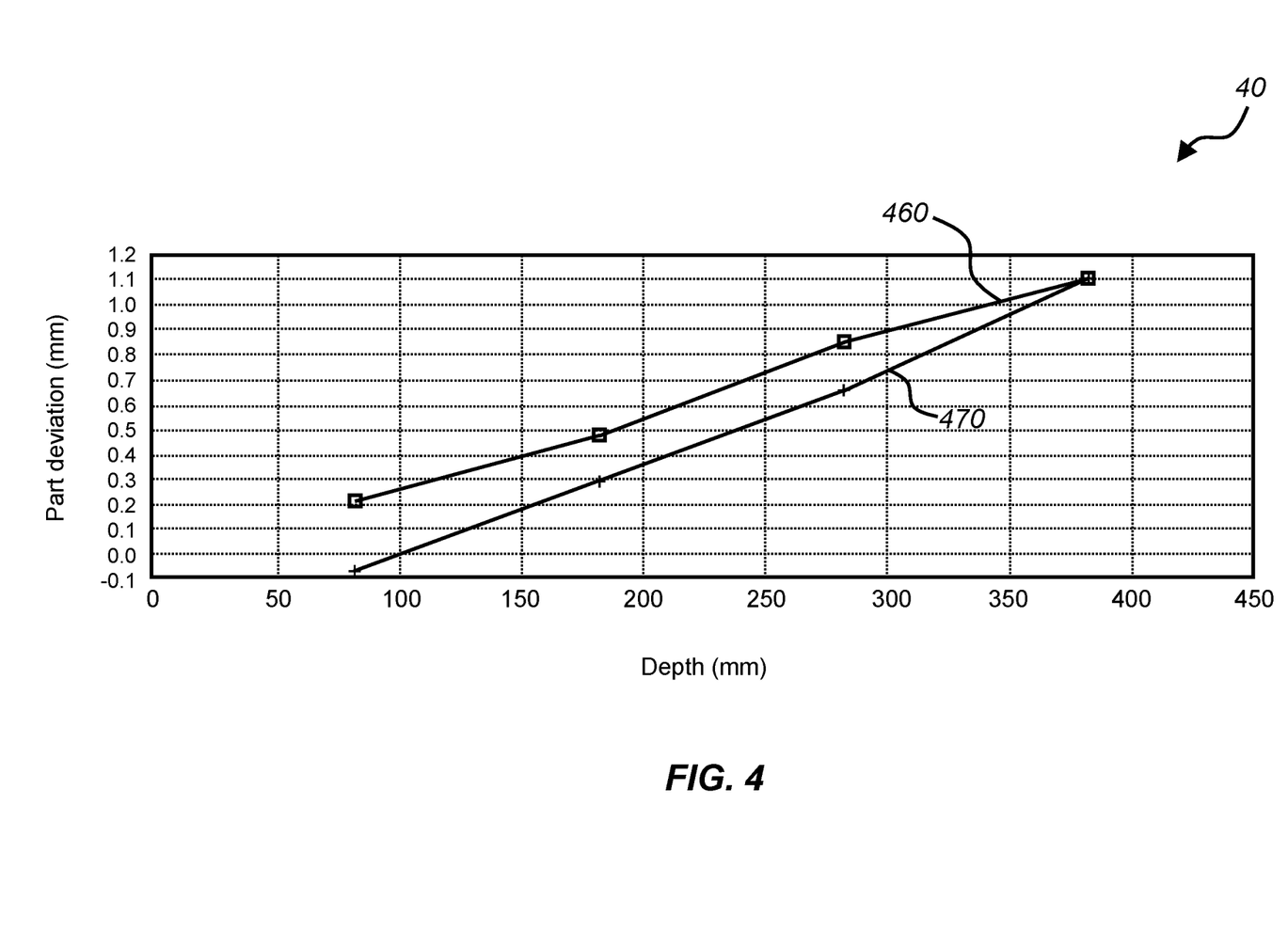
FIG. 4 is a plot of data obtained from an apparatus in accordance with an example.

FIG. 4 shows a plot of data 40 obtained from an apparatus in accordance with an example. The data 40 comprises measurements associated with a plurality of 3D objects generated by an apparatus, such as that described in relation to FIGS. 1 to 3. The x-axis represents a depth of the build volume and the y-axis represents a part deviation between a desired dimension and a final dimension of a 3D object. The desired dimension is determined by model data of a model of a 3D object that is obtained before the build commences. The desired dimension is therefore a target value. The final dimension is an actual dimension measured on the 3D object that is built by the apparatus. A positive deviation represents a shrinkage of the 3D object (desired dimension minus the final dimension). The dimension may be taken at a middle of a working area of a build zone. The depth is a vertical position (in a Z-direction) downwardly into the build volume. A zero depth may therefore correspond to the position of the build platform at a first position before build material is deposited on the build platform, i.e. an initial layer of build material.

The example plot of data 40 shows the relationship between depth and part deviation using two separate lines. Each of the two lines comprises a plurality of data points. A first line 460 represents information derived using a first material, such as PA12. A second line 470 represents information derived using a second material, such as PA11. Therefore, the relationship depends on the build material. Given that a 3D object is printed across a plurality of layers, and hence a plurality of platform positions, each data point on the x-axis represents an average platform position of each 3D object. A deviation of each 3D object of each line 460, 470 (represented by each data point) is shown.

According to the example plot of data 40 shown in FIG. 4, the deviation each 3D object that was manufactured in one of in four depths in the build volume is shown (a first, lowermost depth is shown between 50-100 mm; a second depth is shown between 150-200 mm; a third depth is shown between 250-300 mm; and a final, uppermost depth is shown between 350-400 mm). Each depth in the build volume that the entire 3D object is produced may be referred to as an object depth. The object depth may be a depth in the build volume corresponding to a central location of the 3D object in the Z-direction. The 3D object manufactured from each layer may be referred to as a finished object or product. The deviation of a 3D object increases with each successive object depth, the greatest part deviation existing on lowermost object depth. For the range of object layers shown, the increase of part deviation is generally proportional to depth.

Figure 5:
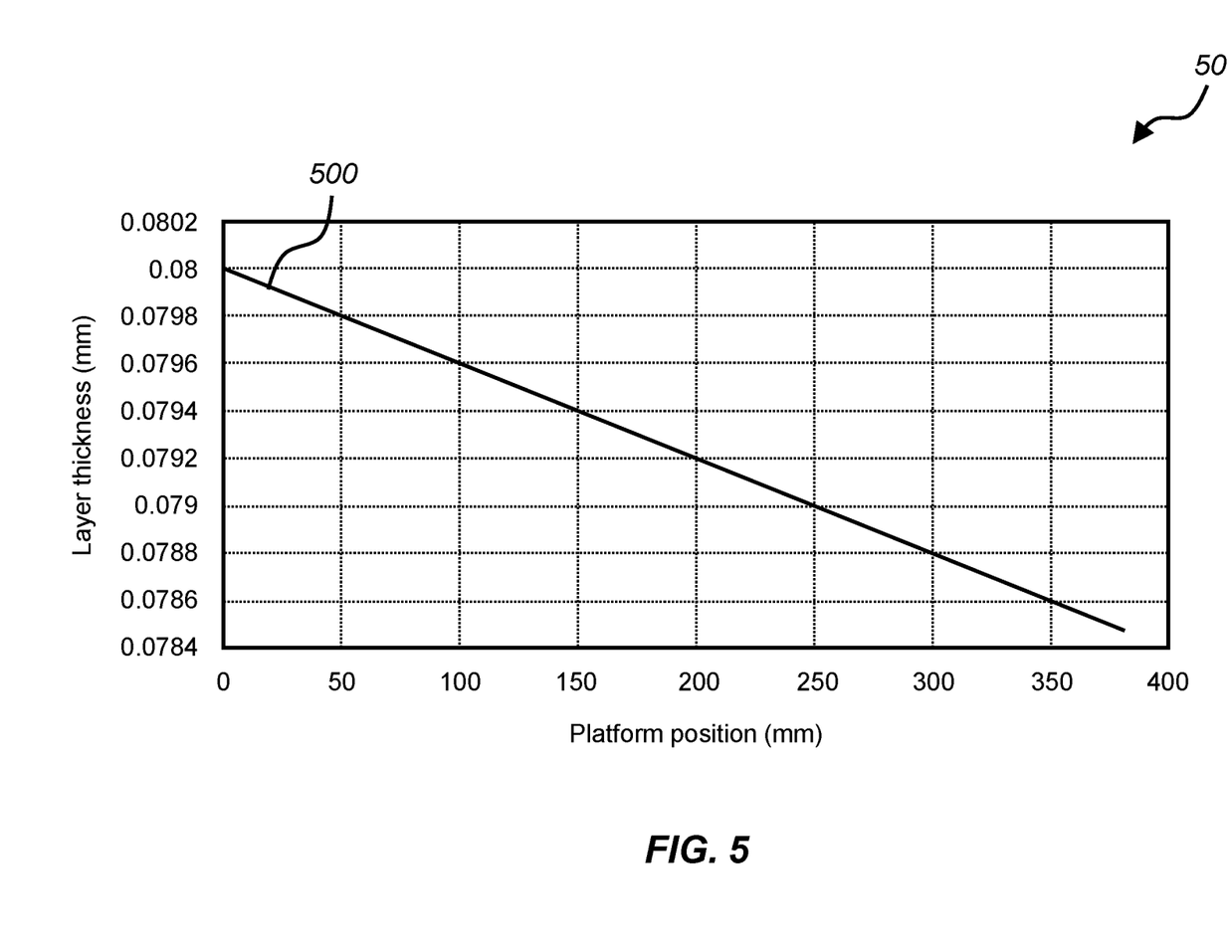
FIG. 5 is a plot of data showing a trendline for an apparatus in accordance with an example.

FIG. 5 is a plot of data 50 showing a trendline 500 for an apparatus in accordance with an example. The data 50 comprises a build platform position (referred to as a platform position) and a layer thickness. The platform position is the x-axis and the layer thickness is the y-axis. The trendline 500 represents a deposited thickness of a layer of build material (i.e. a layer of build material that is received in the build zone) with respect to a relative position of the build platform in the Z-direction. A platform position of 0 mm corresponds to a first layer of build material. An increase in the platform position according to the plot of data 50 corresponds to a movement of the platform position in the Z-axis direction. In the data plot 50 shown, the highest platform position provides for the lowest thickness of a layer of build material. An increase of the build platform position results in a decrease in a thickness of a layer of build material. A trendline 500 may be empirically obtained for each build material using information about a part deviation from a plurality of object depths, as discussed in relation to FIG. 4.

In the example of FIG. 5, each layer of build material is predetermined based on a platform position. Therefore, a displacement (i.e. a final advance) of a build platform from a first position on which build material has been received to a second position on which further build material is to be received can be calculated using the following equations:

$$\text{Final Advance} = \text{Nominal Advance} + \text{Compaction Compensation} \quad \text{Equation 1}$$

$$\text{Compaction Compensation} = \text{Current Platform Position} \times \text{Nominal Advance} \times \text{Correction Factor} \quad \text{Equation 2}$$

The term advance or displacement are interchangeable and may define a drop of the build platform in the Z-direction. The term nominal advance corresponds to a displacement (i.e. an advance) of the build platform that is constant. The nominal advance may be a displacement that is uncompensated for gravitational compaction. The term compaction compensation may be referred to as a thickness compensation. A constant displacement produces layers of deposited build material that are initially the same (before shrinkage caused by natural compaction occurs). Therefore, each slice of a model to be generated by the apparatus may be equal. The term final advance may therefore be viewed as an adjusted nominal advance of the build platform. The correction factor is determined based on the gradient of the trendline 500 of FIG. 5 so that the build platform moves to create the desired layer thickness. Using the above equations, a final advance can be determined based on a current platform position and the determined correction factor. At least one of the displacements of the build platform is then based on data determined from a three-dimensional object obtained in a previous build. Each displacement may be determined by a controller during a build. However, the correction factor may be predetermined.

Figure 6:
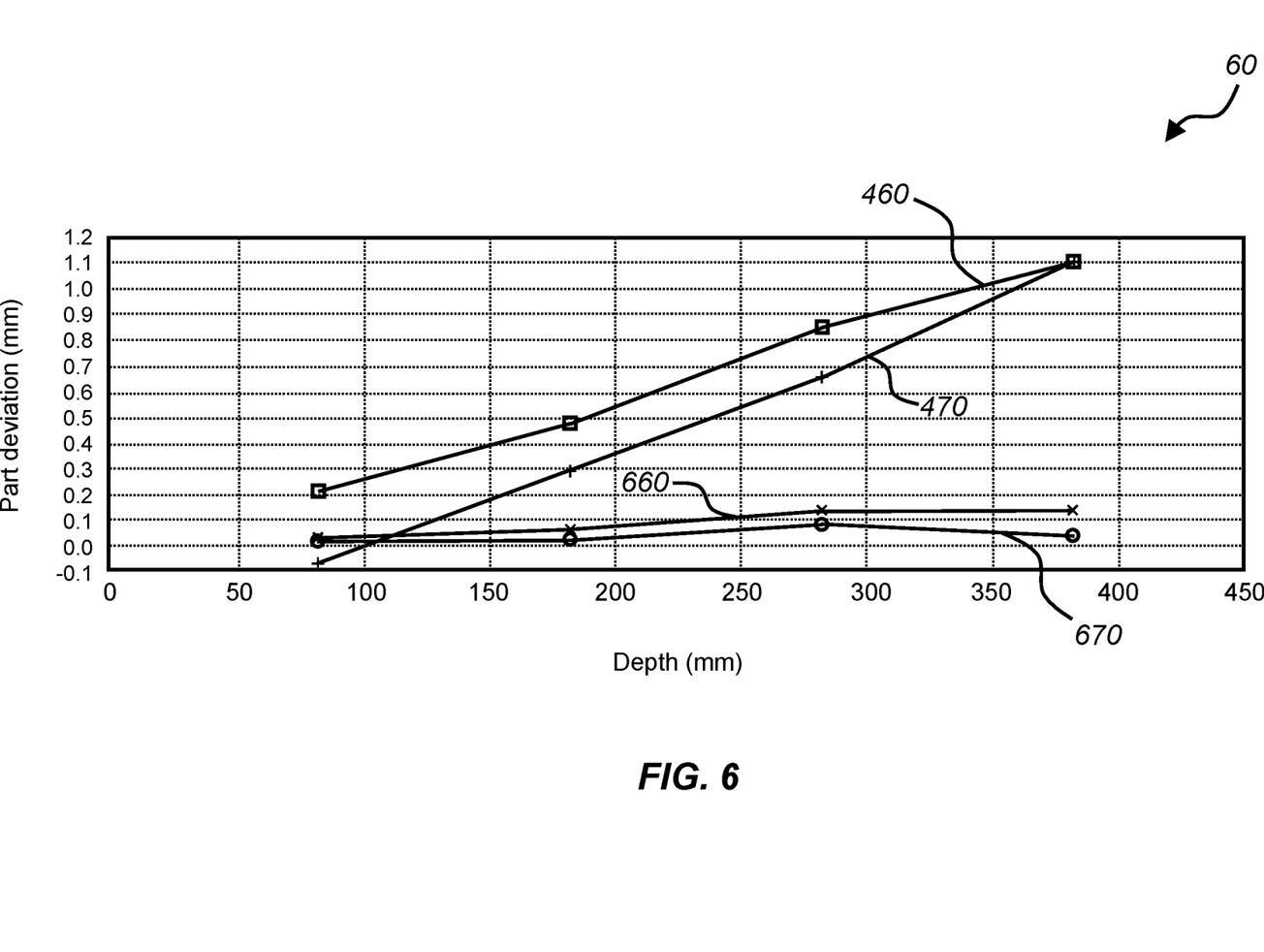
FIG. 6 is a plot of data obtained from an apparatus before and after a correction factor is applied in accordance with an example.

FIG. 6 illustrates a plot of data 60 obtained from an apparatus before and after a correction factor is applied in accordance with an example. The plot of data 60 comprises the first line 460 plotted for a first material, such as PA12 and the second line 470 plotted for a second material, such as PA11 as shown in FIG. 4. These lines 460, 470 show the part deviation of each 3D object on the four object depths before the correction factor is applied, for example, when just a nominal advance is used to move the build platform. When an adjusted nominal advance is used, the part deviation reduces significantly. In some instance, an adjusted first line 660 and an adjusted second line 670 show a reduction in the part deviation by around 90%. The dimensional accuracy of the 3D object is maintained when at least one of the displacements of the build platform is based on data determined from a three-dimensional object obtained in a previous build. The approach allows 3D objects produced at the lowermost object depth to be nearly as dimensionally accurate as the uppermost object depth.

Figure 7:
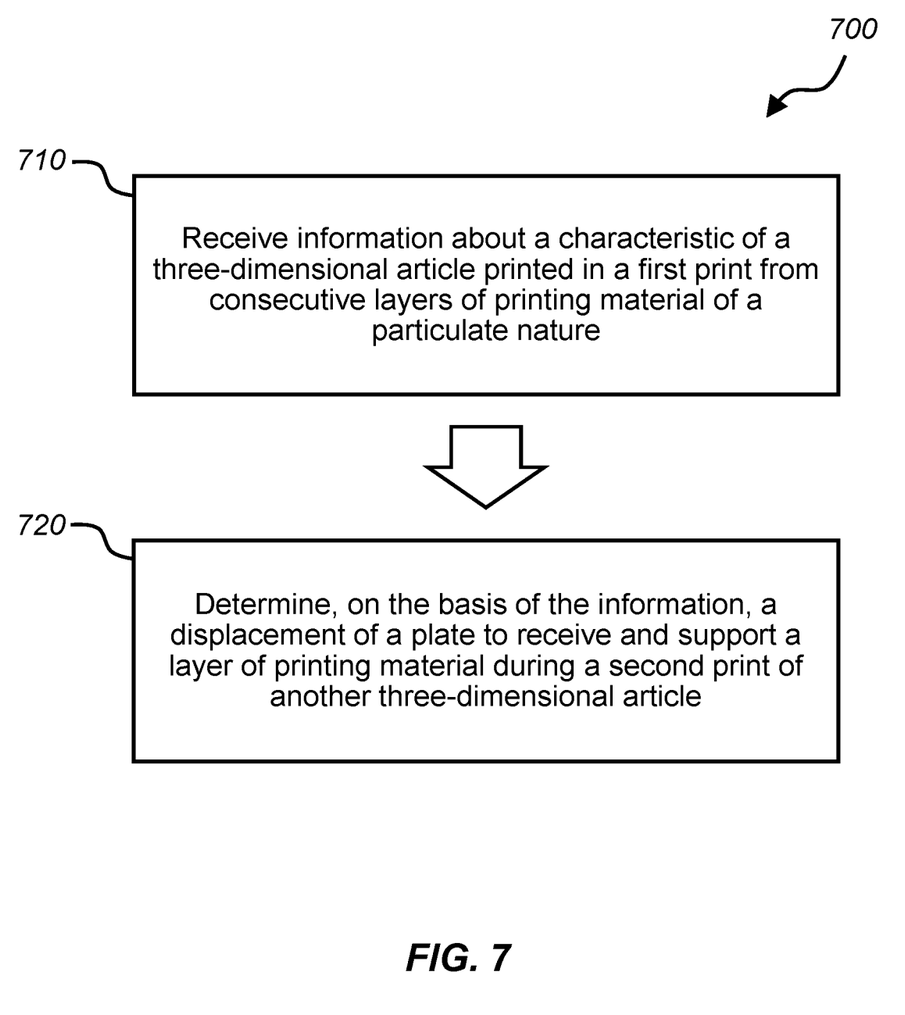
FIG. 7 is a flow chart of an example method of depositing a first layer and a second layer of printing material.

FIG. 7 illustrates a flow diagram of a method 700. The method 700 can be performed by any one of the apparatuses 10, 20, 30 discussed in relation to FIGS. 1 to 3, respectively. At block 710, the method 700 comprises receiving information about a characteristic of a three-dimensional article printed in a first print from consecutive layers of printing material of a particulate nature. The characteristic may be a dimension, such as a height. At block 720, the method 700 comprises determining, on the basis of the information, a displacement of a plate to receive and support a layer of printing material during a second print of another three-dimensional article. The layer of printing material may remain substantially uncompressed until depositing a subsequent layer. The term uncompressed means that the layer of printing material remains in a state of rest. That is, the printing material is left to sit in the same state by which the printing material was deposited, i.e. a deposited state. Uncompressed printing material therefore means printing material that is not exerted on by a predetermined and controlled compressive force, for example by a compression plate.

In some examples, the block 710 may comprise receiving information relating to a final dimension of a printed three-dimensional article in a previous print job measured in a vertical direction of the build with respect to a desired dimension of the printed three-dimensional article in the previous print job.

In some examples, the block 710 may comprise receiving a thickness compensation to compensate for gravitational compaction of a layer of printing material and block 720 may comprise determining the displacement based on applying the thickness compensation to a displacement uncompensated for gravitational compaction. The thickness compensation may be predetermined data. The thickness compensation may be acquired using information relating to a final dimension of a printed object in a previous print job in a direction of layering with respect to a desired dimension of the printed object according to a build plan in the same direction of layering. The direction of layering may be a Z-direction. In some examples, the final dimension and desired dimension are measured at a central region of a printable area. The central region may correspond to the middle region of a build zone as previously described.

Certain system components and methods described herein may be implemented by way of non-transitory computer program code that is storable on a non-transitory storage medium. In some examples, the controller 110, 210, 310 may comprise a non-transitory computer readable storage medium comprising a set of computer-readable instructions stored thereon. The controller 110, 210, 310 may comprise at least one processor. Alternatively, at least one controller 110, 210, 310 may implement all or at least one part of the methods described herein.

Figure 8:
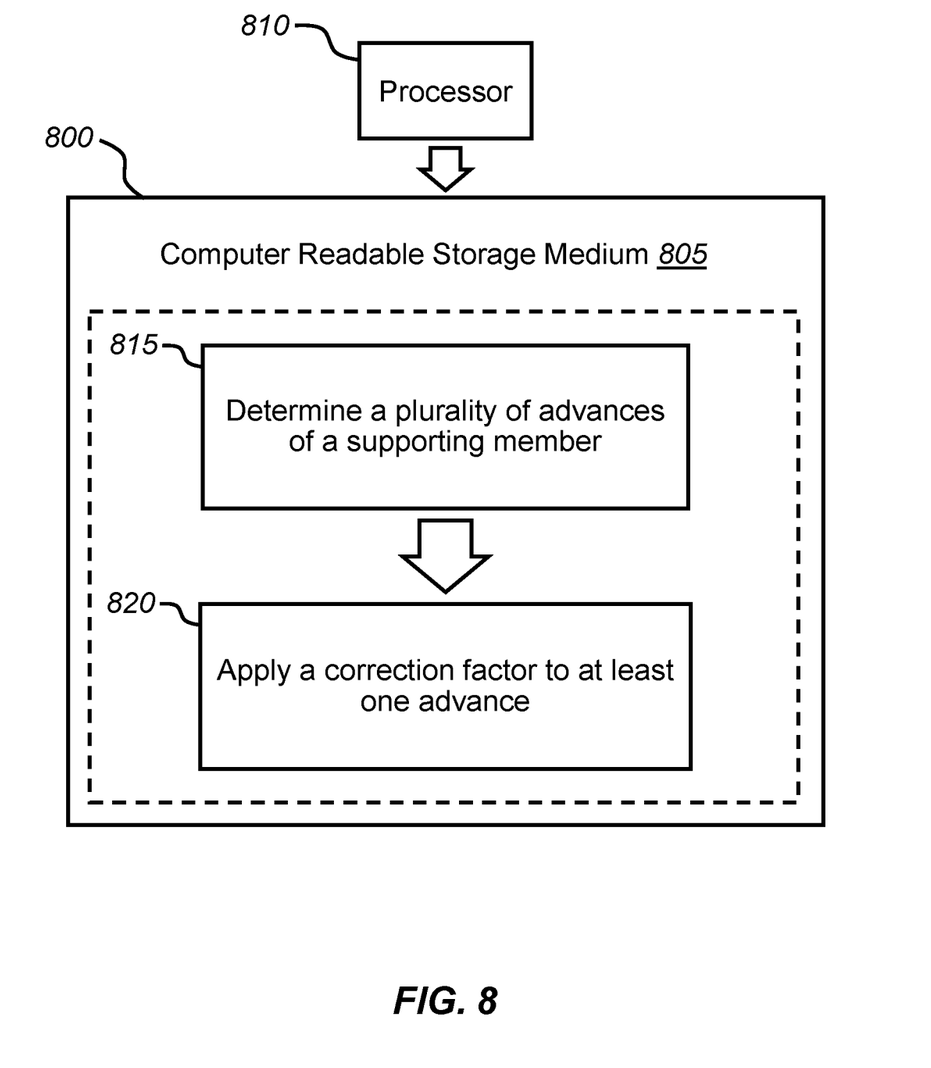
FIG. 8 is a schematic diagram showing an example set of computer readable instructions within a non-transitory computer-readable storage medium.

FIG. 8 shows an example of such a non-transitory computer readable storage medium 805 comprising a set of computer readable instructions 800 which, when executed by at least one processor 810, cause the at least one processor 810 to perform a method according to examples described herein. The computer readable instructions 800 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The processor 810 may be a parallel processor or a serial processor. The processor 810 may execute the instructions may be carried out in any suitable order, or simultaneously.

In an example, instructions 800 cause the processor 810 in a printing device to, at block 815, determine a plurality of advances of a supporting member in a print chamber to move the supporting member between adjacent positions and change a size of the print chamber and receive a successive fresh deposit of build material. At block 820, the instructions 800, cause the processor 810 to apply a correction factor to at least one advance to adjust a magnitude of the at least one advance, wherein the correction factor is based on a comparison between a dimension of a virtual product and a previously printed product based on the virtual product. The printed product is a finished product which may be printed from a plurality of layers of the same build material as a product to be printed. The finished product refers to a 3D object that has been built (i.e. printed) by fusing a plurality of layers of build material. In some examples, the dimension of the finished product corresponds to a portion of the finished product built at a central region of a working area of the print chamber. In some examples, the dimension is measured in a direction of layering of the build material in the finished product, wherein the direction of layering is a direction of thickness of the layers of build material in the finished product.

In some examples, the instructions 800, cause the processor 810 to cause movement of the supporting member in the print chamber from the first position to a second position by a first advance. The instructions 800, may cause the processor 810 to determine a second advance of the build platform from the second position to a third position to receive a third layer of build material on the first and second layers of build material wherein the first advance is different to the second advance.

In some examples, a block may comprise receiving position data relating to a relative position of the supporting member and on the basis of the position data, determining a first advance and a second advance by which to change the relative position of the supporting member.

In some examples, the first advance and second advance may be determined using the correction factor applied to a current position of the build platform and an initial advance of the build platform.

The non-transitory machine-readable storage medium 805 may be encoded with the other instructions relating to the functioning of the additive manufacturing system.

It will be appreciated that the example blocks may be implemented at various locations across a network. For example, a remote computer may store encoded instructions for performing an example of the calibration process described above. A local or terminal computer may access the remote computer and access the encoded instructions. It will be appreciated that the example blocks may be implemented by a dedicated circuit, for example a DSP or a programmable logic array.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. An apparatus comprising:
a controller to:
instruct a build platform to support a plurality of layers of build material in a build zone, wherein the build platform is moveable during a build operation of a three-dimensional object to change a size of the build zone; and
determine respective displacements of the build platform to successively receive the plurality of layers of build material in the build zone during the build operation, wherein a first displacement of the respective displacements is different from a second displacement of the respective displacements and is based on data determined from a three-dimensional object obtained in a previous build operation, the first displacement computed based on a correction factor derived from the data determined from the three-dimensional object obtained in the previous build operation.

2. The apparatus of claim 1, wherein the data comprises a deviation of a dimension of the three-dimensional object from a corresponding dimension of a virtual three-dimensional object in a build plan.

3. The apparatus of claim 1, wherein the first displacement is based on data determined from a plurality of three-dimensional objects obtained from the previous build operation.

4. The apparatus of claim 3, wherein each of the plurality of three-dimensional objects is built at a different depth in a build volume.

5. The apparatus of claim 3, wherein the data comprises a deviation of a dimension of each of the plurality of three-dimensional objects from a corresponding dimension of a virtual three-dimensional object in a build plan.

6. The apparatus of claim 1, wherein a plurality of the displacements is based on the data determined from the three-dimensional object obtained in the previous build operation, and wherein a magnitude of a displacement of the plurality of the displacements is different from a magnitude of another displacement of the plurality of the displacements.

7. The apparatus of claim 6, wherein each successive displacement of the plurality of the displacements is equal to or lower in magnitude than a magnitude of a previous displacement of the build platform during the build operation.

8. The apparatus of claim 6, wherein differences in magnitude between successive displacements of the plurality of the displacements are equal.

9. A method comprising:
receiving information about a characteristic of a first three-dimensional article printed in a first print from consecutive layers of a printing material; and
determining, based on the information, a displacement of a plate to receive and support a layer of the printing material during a second print of a second three-dimensional article, the displacement computed based on a correction factor derived from the information about the characteristic of the first three-dimensional article printed in the first print.

10. The method of claim 9, wherein the characteristic comprises a dimension.

11. The method of claim 10, wherein the dimension is measured in a vertical direction of a build operation in the first print.

12. The method of claim 9, wherein the correction factor is to compensate for gravitational compaction of a layer of printing material.

13. A non-transitory computer readable storage medium comprising computer-readable instructions that upon execution on a processor, cause the processor to, in a printing device:
determine a plurality of advances of a supporting member in a print chamber to move the supporting member between adjacent positions and change a size of the print chamber and receive a successive fresh deposit of build material; and
apply a correction factor to at least one advance to adjust a magnitude of the at least one advance, wherein the correction factor is based on a comparison between a dimension of a virtual product and a dimension of a previously printed product based on the virtual product.

14. The non-transitory computer readable storage medium of claim 13, wherein the dimension of the previously printed product corresponds to a portion of the previously printed product built at a central region of a working area of the print chamber.

15. The non-transitory computer readable storage medium of claim 13, wherein the dimension of the previously printed product is measured in a direction of thickness of layers of build material in the previously printed product.

16. The apparatus of claim 1, wherein the data determined from the three-dimensional object obtained in the previous build operation comprises a measured physical property of the three-dimensional object produced by the previous build operation.

17. The apparatus of claim 16, wherein the measured physical property comprises a measured dimension of the three-dimensional object produced by the previous build operation.

18. The apparatus of claim 1, wherein the previous build operation is a calibration build operation.

19. The apparatus of claim 1, wherein the first displacement is based on a nominal displacement for advancing the build platform during the build operation and the correction factor.

20. The method of claim 12, wherein the displacement is based on a nominal displacement for advancing the plate during the second print and the correction factor.

* * * * *